(12) United States Patent
Kapoor et al.

(10) Patent No.: US 12,118,355 B2
(45) Date of Patent: Oct. 15, 2024

(54) CACHE COHERENCE VALIDATION USING DELAYED FULFILLMENT OF L2 REQUESTS

(71) Applicant: International Business Machines Corporation, Armonk, NY (US)

(72) Inventors: Shakti Kapoor, Austin, TX (US); Manoj Dusanapudi, Bangalore (IN); Nelson Wu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 17/506,122

(22) Filed: Oct. 20, 2021

(65) Prior Publication Data

US 2023/0122466 A1    Apr. 20, 2023

(51) Int. Cl.
*G06F 9/30*       (2018.01)
*G06F 9/38*       (2018.01)
*G06F 12/0811*  (2016.01)

(52) U.S. Cl.
CPC ...... *G06F 9/30043* (2013.01); *G06F 9/30047* (2013.01); *G06F 9/3834* (2013.01);
(Continued)

(58) Field of Classification Search
CPC .............. G06F 9/30043; G06F 9/30047; G06F 9/3834; G06F 9/3836; G06F 12/0811;
(Continued)

(56) References Cited

U.S. PATENT DOCUMENTS

| 5,185,871 | A | * | 2/1993 | Frey | ...................... G06F 9/3834 712/205 |
| 5,404,483 | A | * | 4/1995 | Stamm | ................ G06F 12/0831 711/143 |

(Continued)

OTHER PUBLICATIONS

Mammo, Biruk W., et al. "Post-silicon validation of multiprocessor memory consistency." IEEE Transactions on Computer-Aided Design of Integrated Circuits and Systems pp. 1027-1037. (Year: 2015).*

(Continued)

*Primary Examiner* — Andrew Caldwell
*Assistant Examiner* — Kasim Alli
(74) *Attorney, Agent, or Firm* — SCULLY, SCOTT, MURPHY & PRESSER, P.C.; Stosch Sabo

(57) ABSTRACT

Methods and systems for validating cache coherence in a data processing system are described. A processing element may detect a load instruction requesting the processing element to transfer data from a global memory location to a local memory location. The processing element may apply, in response to detecting the load instruction requesting the processing element to transfer data from the global memory location to the local memory location, a delay to the transfer of the data from the global memory location to the local memory location. The processing element may execute the load instruction and transferring the data from the global memory location to the local memory location with the applied delay. The processing element may validate, in response to executing the load instruction and transferring the data with the applied delay, a cache coherence of the data processing system.

17 Claims, 4 Drawing Sheets

(52) U.S. Cl.
CPC .......... *G06F 9/3836* (2013.01); *G06F 9/3861* (2013.01); *G06F 12/0811* (2013.01)

(58) Field of Classification Search
CPC ............. G06F 12/0815; G06F 11/2242; G06F 11/2247; G06F 11/2236; G06F 11/263; G06F 11/3688; G06F 11/3684; G06F 11/3696; G06F 11/3632
See application file for complete search history.

(56) References Cited

U.S. PATENT DOCUMENTS

| | | | | |
|---|---|---|---|---|
| 6,047,316 | A * | 4/2000 | Barton | G06F 9/52 709/216 |
| 6,567,873 | B1 * | 5/2003 | Henriksen | G06F 13/3625 710/240 |
| 6,810,475 | B1 * | 10/2004 | Tardieux | G06F 9/3867 712/217 |
| 7,376,816 | B2 * | 5/2008 | Barrick | G06F 9/383 712/217 |
| 7,712,081 | B2 * | 5/2010 | Biberstein | G06F 11/3684 717/124 |
| 9,740,614 | B2 | 8/2017 | Bradbury et al. | |
| 9,740,616 | B2 | 8/2017 | Busaba et al. | |
| 10,621,092 | B2 | 4/2020 | Latorre et al. | |
| 2003/0088636 | A1 * | 5/2003 | Nakamura | G06F 9/383 712/E9.047 |
| 2003/0221071 | A1 * | 11/2003 | McKenney | G06F 9/526 711/151 |
| 2005/0240850 | A1 * | 10/2005 | Ohwada | G01R 31/318547 714/E11.16 |
| 2006/0107158 | A1 * | 5/2006 | Mishra | G06F 30/3323 714/741 |
| 2007/0186053 | A1 * | 8/2007 | Chaudhry | G06F 9/3863 712/E9.05 |
| 2007/0288725 | A1 | 12/2007 | Luick | |
| 2009/0024876 | A1 * | 1/2009 | Arora | G06F 11/261 714/E11.159 |
| 2009/0024886 | A1 * | 1/2009 | Arora | G01R 31/318357 714/720 |
| 2010/0332766 | A1 * | 12/2010 | Zeffer | G06F 12/0842 711/144 |
| 2014/0282423 | A1 * | 9/2014 | Gottschlich | G06F 9/52 717/127 |
| 2015/0170764 | A1 * | 6/2015 | Budhabhatti | G06F 12/0802 714/718 |
| 2017/0161073 | A1 * | 6/2017 | Chen | G06F 11/3632 |
| 2017/0220440 | A1 * | 8/2017 | Dusanapudi | G06F 11/2242 |
| 2017/0263332 | A1 * | 9/2017 | Kapoor | G11C 29/12015 |
| 2020/0210318 | A1 * | 7/2020 | Bryan | G06F 11/3632 |

OTHER PUBLICATIONS

A. DeOrio, A. Bauserman and V. Bertacco, "Post-silicon verification for cache coherence," 2008 IEEE International Conference on Computer Design, Lake Tahoe, CA, USA, 2008, pp. 348-355 (Year: 2008).*

Titos, R., et al., "Speculation-Based Conflict Resolution in Hardware Transactional Memory", 23rd IEEE International Symposium on Parallel and Distributed Processing, IPDPS 2009, May 2009, 13 pages.

Papagiannopoulou, D., et al., "Speculative Synchronization for Coherence-Free Embedded NUMA Architecture", 2014 International Conference on Embedded Computer Systems: Architectures, Modeling, and Simulation (SAMOS KIV), Jul. 2014, pp. 99-106.

Porter, L., et al., "Mapping Out a Path from Hardware Transactional Memory to Speculative Multithreading", In Proceedings of the 18th International Conference on Parallel Architectures and Compilation Techniques (PACT 2009), Sep. 2009, 13 pages.

Le, H.Q., et al., "IBM Power6 Microarchitecture", IBM Journal of Research and Development, Nov. 2007, pp. 639-662, vol. 51, No. 6.

Disclosed Anonymously, "Simultaneous Data Prefetch Request Probing and Recycled Data Forwarding from a Load Store Unit", An IP.com Prior Art Database Technical Disclosure, IP.com No. IPCOM000221102D, Aug. 29, 2012, 7 pages.

Disclosed Anonymously, "Speculative Cache Data Read", An IP.com Prior Art Database Technical Disclosure, IP.com No. IPCOM000219117D, Jun. 19, 2012, 3 pafes.

Disclosed Anonymously, "Method for Latency-Saving Microarchitecture for Data Return in CPUs with Snoop- Based Cache Coherence and Integrated Memory Controllers", An IP.com Prior Art Database Technical Disclosure, IP. com No. IPCOM000143981D, Dec. 13, 2006, 7 pages.

* cited by examiner

CACHE COHERENCE VALIDATION USING DELAYED FULFILLMENT OF L2 REQUESTS

BACKGROUND

The present invention relates to executions in a processor and more specifically to data processing, and more specifically to validation of cache coherence in a multithread processor, a multicore processor, or other types of computing systems having multiple processing elements.

In a data processing system including multiple processing elements (e.g., a system having multiple processors, or a processor having multiple cores), all processing elements may access shared memory devices (e.g., such as cache memory). Each processing element may perform respective tasks (e.g., threads) that may read and write data in a same location (e.g., cache line) of the shared memory devices. The processing elements need to communicate with one another to maintain cache coherency in order to ensure that any read or write operation is reading or writing accurate values in the shared memory devices.

SUMMARY

The summary of the disclosure is given to aid understanding of the computer processing systems and methods of validating cache coherence among multiple processor cores, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

In some examples, a method for validating cache coherence in a data processing system is generally described. The method may include detecting a load instruction requesting a processing element to transfer data from a global memory location to a local memory location. The processing element may be among a plurality of processing elements of the data processing system. The method may further include applying, in response to detecting the load instruction requesting the processing element to transfer data from the global memory location to the local memory location, a delay to the transfer of the data from the global memory location to the local memory location. The method may further include executing the load instruction and transferring the data from the global memory location to the local memory location with the applied delay. The method may further include validating, in response to executing the load instruction and transferring the data with the applied delay, a cache coherence of the data processing system.

In some examples, a computing system for validating cache coherence is generally described. The computing system may include a first processing element, a second processing element, and an interconnect connected to the first processing element and the second processing element. The first processing element may be configured to detect a load instruction requesting a processing element to transfer data from a global memory location to a local memory location. The global memory location may be accessible by the first processing element and the second processing element, and the local memory location may be accessible by the first processing element. The first processing element may be further configured to apply, in response to detecting the load instruction requesting the first processing element to transfer data from the global memory location to the local memory location, a delay to the transfer of the data from the global memory location to the local memory location. The first processing element may be further configured to execute the load instruction and transferring the data from the global memory location to the local memory location with the applied delay. The first processing element may be further configured to validate, in response to the execution of the load instruction and transferring the data with the applied delay, a cache coherence of the computing system.

In some examples, a processing element for validating cache coherence is generally described. The processing element may include a processor pipeline. The processor pipeline may include one or more load store units (LSUs) configured to execute load and store instructions. The one or more LSUs may be configured to detect a load instruction requesting the processing element to transfer data from a global memory location to a local memory location. The processing element may be among a plurality of processing elements of a data processing system. The one or more LSUs may be configured to apply, in response to detecting the load instruction requesting the processing element to transfer data from the global memory location to the local memory location, a delay to the transfer of the data from the global memory location to the local memory location. The one or more LSUs may be configured to execute the load instruction and transferring the data from the global memory location to the local memory location with the applied delay. The one or more LSUs may be configured to validate, in response to executing the load instruction and transferring the data with the applied delay, a cache coherence of a data processing system including the processing element.

Further features as well as the structure and operation of various embodiments are described in detail below with reference to the accompanying drawings.

BRIEF DESCRIPTION OF THE DRAWINGS

The various aspects, features, and embodiments of a processor, processor system, and/or method of processing data will be better understood when read in conjunction with the figures provided. Embodiments are provided in the figures for the purpose of illustrating aspects, features, and/or various embodiments of the processor, processor system, and methods of managing and processing data, but the claims should not be limited to the precise system, embodiments, methods, processes and/or devices shown, and the features, and/or processes shown may be used singularly or in combination with other features, and/or processes. It may be noted that a numbered element is numbered according to the figure in which the element is introduced, is often, but not always, referred to by that number in succeeding figures, and like reference numbers in the figures often, but not always, represent like parts of the illustrative embodiments of the invention.

DETAILED DESCRIPTION

Figure 1:
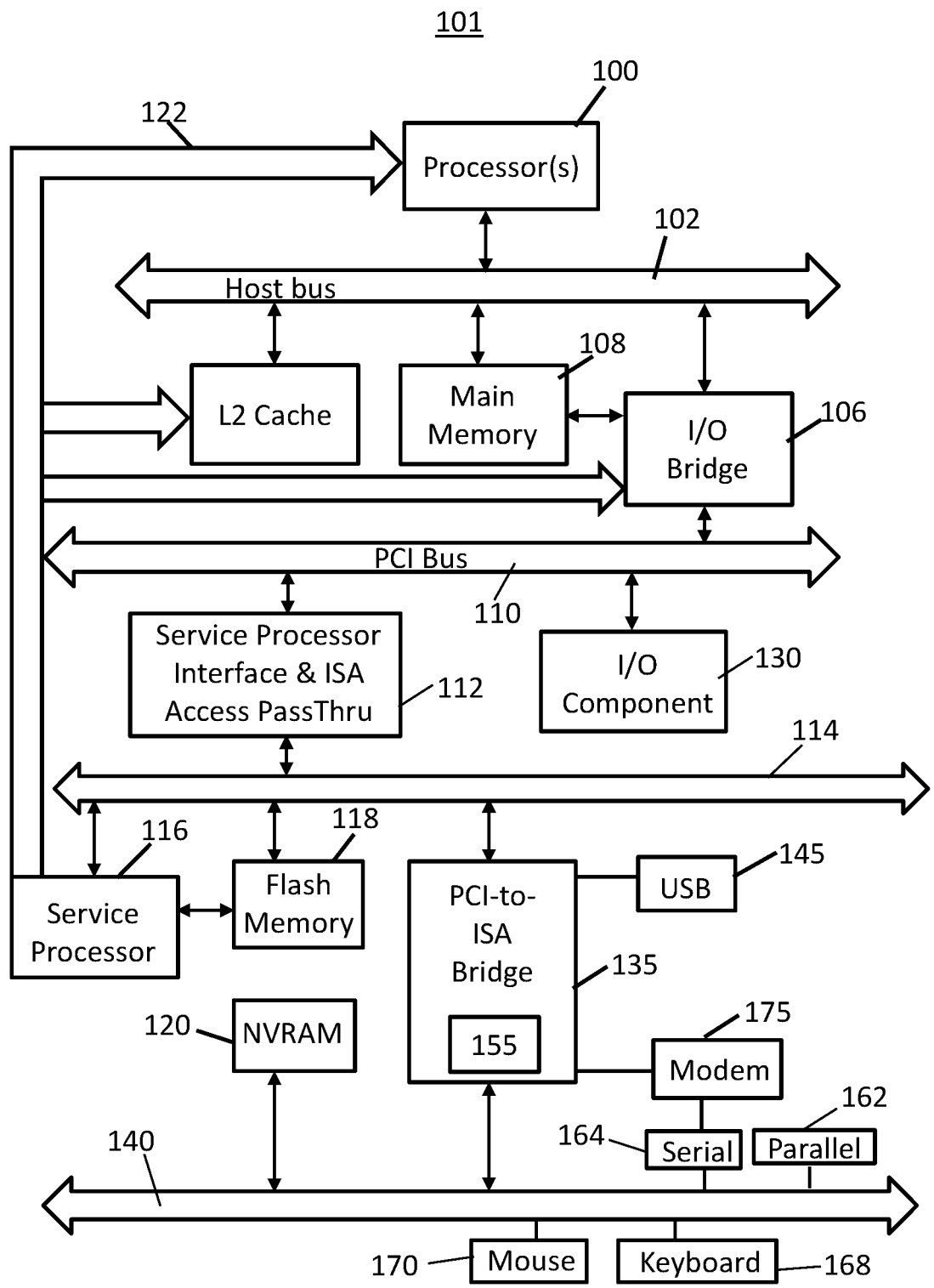
FIG. 1 depicts a general computing or data processing system in accordance with an embodiment.

The following description is made for illustrating the general principles of the invention and is not meant to limit the inventive concepts claimed herein. In the following detailed description, numerous details are set forth in order to provide an understanding of a processor, its architectural structure, and its method of operation, however, it will be understood by those skilled in the art that different and numerous embodiments of the processor, architectural structure, and method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The term "workload" of a processor refers to the number of instructions being executed by the processor during a given period or at a particular instant of time.

A processor may process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In an example, the pipeline (in addition to other circuitry) may be placed in a portion of the processor referred to as the processor core. Some processors may have multiple processor cores (e.g., multiprocessor system), and in some cases, each processor core may have multiple pipelines. Where a processor core has multiple pipelines, groups of instructions (referred to as issue groups) may be issued to the multiple pipelines in parallel and executed by each of the pipelines in parallel. The pipeline may include multiple stages, such as a decode stage, a dispatch stage, an execution stage, etc. The execution stage may include execution units that process different types of operations as specified by the instructions. For example, a load store unit (LSU) is an execution unit that processes, for example, load instructions and store instructions.

In an example, the physical addresses of a store and load instructions that are committed may be stored as entries in one or more load store queues (LSQs) of a LSU. The LSQs may include load refresh queues (LRQs) and store reorder queues (SRQs). In an example, the SRQs and LRQs may reside in a local memory, such as a L1 data cache of a processor core. The entries in the SRQs may be store instructions that are committed, where committed store instructions may be store instructions that are completed by a thread, a processor core, or processing element, the completion cannot be undone, and other processing elements are not aware of the completion until the SRQ is drained to global memory (e.g., a level two (L2) cache or a level three (L3) cache, or other memory accessible by more than one processing element). Upon draining a SRQ or a committed store instruction to global memory, a value being stored or updated in a memory address specified by the committed store instruction may be visible to all processors or processing elements among the multiprocessor system.

In an example, physical addresses associated with a load instruction may be stored as entries in the LRQs such that load instructions may be tracked by the LRQs. The entries in the LRQ may be load instructions that are waiting to be completed or retired by the processor core. In an example, load instructions and store instructions may be issued in order, but may be completed out of order due to various factors, such as different software or application implementations, dependencies on other threads, available resources, an order in which the data being stored arrives to global memory, or data being loaded from the global memory, etc. Depending on the requirements and the availability of resources, the load and store instructions may be completed out of order, and may not be completed until all the younger load and store instructions have been completed. If an older instruction is not completed for any reason, then all younger load and store instructions must be flushed, and the original values in the affected resources must be restored and re-executed.

For example, when a LSU executes a load instruction, the LSU may check in the LRQ to identify any younger load instructions (e.g., load instructions arrived later than the load instruction) that has the same target as the load instruction, and that has already executed. In response to identifying such a younger load instruction, the younger load instruction may need to be re-execute in order to maintain sequential load consistency and to ensure that the younger load instruction does not read a value from the target that may be older than what will be read by the older load instruction (e.g., the load instruction being executed by the LSU). In an example, a younger load instruction may complete before an older load instruction when the older load instruction is waiting for data necessary for its completion.

In an example, to validate load and store coherence among multiple processing elements (e.g., processor cores, multiple threads, etc.) special corners in micro-architecture may be introduced to a system having the multiple processing elements. The special corners may be introduced intentionally to test whether specific processes and/or logic for managing cache coherence, include load and store coherence, are functioning correctly or not. For example, a specific logic may be implemented for detecting completion of younger load instructions and for triggering re-execution of the detected younger load instructions. To validate or test this specific logic, out-of-order hazards can be introduced to delay completion of the older load instructions and allow younger load instructions to complete. Note that if all out-of-order load instructions are completed without errors, then the changes of identifying errors in the specific logic may be reduced.

In an example, software may be implemented to create out-of-order hazards to test and validate load and store coherence. However, these software may be relatively complicated to design, resulting in more development cost of processors. For example, software may be implemented for delaying load and store instructions across various boundaries of the cache lines or intra-cache line boundaries. However, the time to design, develop, and test these software on different computer architectures may not be desirable. Further, as various computer architecture designs changes and become more complicated, these software may also need to be redesigned and changed to accommodate the architecture changes. To be described in more detail below, hardware components may be utilized to create and control out-of-order hazards, where the hardware components may be switched on and off (e.g., by firmware) selectively. For example, the hardware components may be switched on for validation purposes or debugging a possible failure, and may be switched off at other times. Also, the hardware components may be implemented in different computer architectures without a need for software changes. The utilization of hardware components to perform these delays may reduce the cost of software development, and may enable faster mean time to identify failure, thus improving the visibility of fail cases in validating load and store coherences.

FIG. 1 illustrates an information handling system 101 which may be a simplified example of a computer system capable of performing the computing operations described herein. Computer system 101 may include one or more processor(s) 100 which is coupled to a host bus 102. The processor(s) 100 may include, for example, an off-the-shelf microprocessor, custom processor, Field Programmable Gate Array (FPGA), Application Specific Integrated Circuit (ASIC), discrete logic, etc., or generally any device for executing instructions. In an example, the processor(s) 101 may be multicore processors including two or more processor cores A level two (L2) cache memory 104 may be coupled to host bus 102. An I/O bridge (e.g., a Host-to-PCI bridge) 106 may be coupled to a main memory 108, where the I/O bridge may include cache memory and main memory control functions, and may provide bus control to handle transfers among a PCI bus 110, the processor 100, the L2 cache 104, the main memory 108, and the host bus 102. Main memory 108 may be coupled to the I/O bridge 106 as well as the host bus 102. Other types of memory, such as Random Access Memory (RAM), and/or various volatile and/or nonvolatile memory devices, may be coupled to the host bus 102 and/or the I/O bridge 106 as well. For example, memory devices coupled to the host bus 102 may include electrically erasable programmable read only memory (EEPROM), flash programmable read only memory (PROM), battery backup RAM, hard disk drives, etc. Nonvolatile memory devices coupled to the host bus 102 may be used for holding executable firmware and any nonvolatile data containing programming instructions that can be executed to cause the processor 100 to perform certain functions, such as the methods described herein. Devices used solely by processor(s) 100, such as I/O component(s) 130, may be coupled to PCI bus 110. Service Processor Interface and ISA Access Pass-through 112 may provide an interface between PCI bus 110 and PCI bus 114. In this manner, PCI bus 114 may be insulated from PCI bus 110. Devices, such as flash memory 118, are coupled to PCI bus 114. In one implementation, flash memory 118 may include BIOS code that incorporates necessary processor executable code for a variety of low-level system functions and system boot functions.

PCI bus 114 may provide an interface for a variety of devices that are shared by host processor(s) 100 and Service Processor 116 including, for example, flash memory 118. PCI-to-ISA bridge 135 provides bus control to handle transfers between PCI bus 114 and ISA bus 140, universal serial bus (USB) functionality 145, power management functionality 155, and can include other functional elements not shown, such as a real-time clock (RTC), DMA control, interrupt support, and system management bus support. Nonvolatile RAM 120 may be attached to ISA Bus 140. Service Processor 116 may include a bus 122 (e.g., JTAG and/or I2C bus) for communication with processor(s) 100 during initialization steps. The bus 122 may also be coupled to L2 cache 104, I/O bridge 106, and main memory 108 providing a communications path between processor, Service Processor, L2 cache, Host-to-PCI bridge, and main memory 108. Service Processor 116 also has access to system power resources for powering down information handling device 101.

Peripheral devices and input/output (I/O) devices can be attached to various interfaces (e.g., parallel interface 162, serial interface 164, keyboard interface 168, and mouse interface 170 coupled to ISA bus 140. Alternatively, many I/O devices can be accommodated by a super I/O controller (not shown) attached to ISA bus 140. Other interfaces that allow the processor(s) 100 to communicate with external devices may include, but are not limited to, serial interfaces such as RS-232, USB (Universal Serial Bus), Small Computer Systems Interface (SCSI), RS-309 or a wireless communication interface such as Wi-Fi, Bluetooth, near-field communication (NFC) or other wireless interfaces.

In an example, in order to attach computer system 101 to another computer system to copy files over a network, I/O component 130 may include a LAN card coupled to PCI bus 110. Similarly, to connect computer system 101 to an ISP to connect to the Internet using a telephone line connection, modem 175 is connected to serial port 164 and PCI-to-ISA Bridge 135.

While FIG. 1 shows one information handling system that employs processor(s) 100, the information handling system may take many forms. For example, information handling system 101 may take the form of a desktop, server, portable, laptop, notebook, or other form factor computer or data processing system. Information handling system 101 may also take other form factors such as a personal digital assistant (PDA), a gaming device, ATM machine, a portable telephone device, a communication device or other devices that include a processor and memory.

Figure 2:
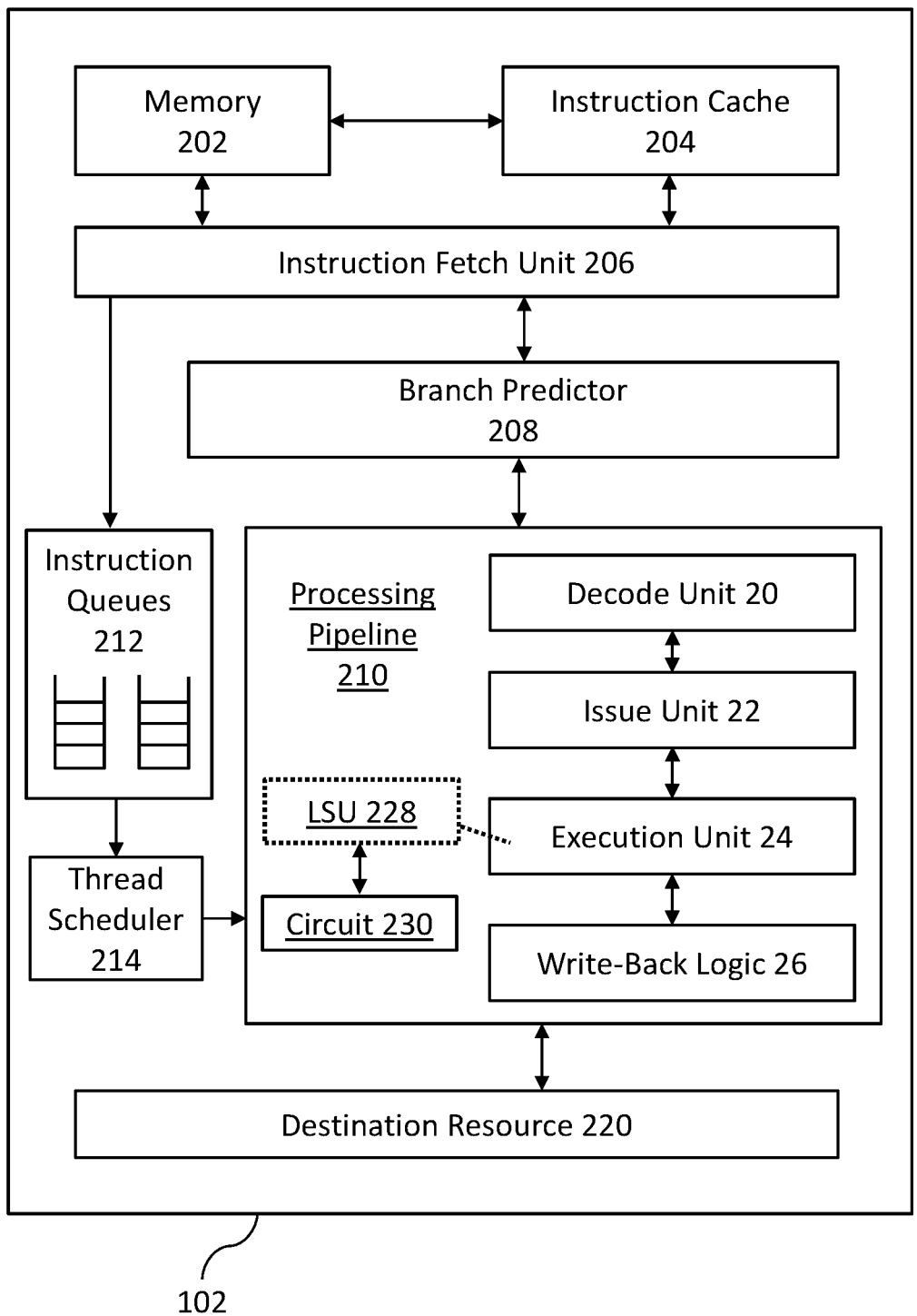
FIG. 2 a block diagram of a processor in accordance with an embodiment.

FIG. 2 depicts a block diagram of a processor 200 according to an embodiment. The processor 200 may include at least a memory 202, an instruction cache 204, an instruction fetch unit 206, a branch predictor 208, and a processor pipeline or a processing pipeline 210. The processor 200 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 200. In one embodiment, instruction cache 204 may be configured to provide instructions in an 8-way set associative structure. Alternatively, any other desired configuration and size may be employed. For example, instruction cache 204 may be implemented as a fully associative, set associative, or direct mapped configuration.

In FIG. 2, a simplified example of the instruction fetch unit 206 and the processing pipeline 210 are depicted. In various embodiments, the processor 200 may include multiple processing pipelines 210 and instruction fetch units 206. In an embodiment, the processing pipeline 210 includes a decode unit 20, an issue unit 22, an execution unit 24, and write-back logic 26. In some examples, the instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 200 is depicted in FIG. 2, other feedback and signaling paths may be included between elements of the processor 200.

Branch instructions (or "branch") can be either unconditional, meaning that the branch is taken every time that the instruction is encountered in the program, or conditional, meaning that the branch is either taken or not taken, depending upon a condition. The processor 200 can provide conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Most often, the instructions to be executed following a conditional branch are not known with certainty until the condition upon which the branch depends has been resolved. The branch predictor 208 can attempt to predict the outcome of conditional branch instructions in a program before the branch instruction is executed. If a branch is mispredicted, all of the speculative work, beyond the point in the program where the branch is encountered, must be discarded. For example, when a conditional branch instruction is encountered, the processor 200 may predict which instruction will be executed after the outcome of the branch condition is known. Then, instead of stalling the processing pipeline 210 when the conditional branch instruction is issued, the processor may continue issuing instructions beginning with the predicted next instruction.

In a conditional branch, control can be transferred to the target address depending upon the results of a previous instruction. Conditional branches may be either resolved or unresolved branches depending on whether the result of the previous instruction is known at the time of the execution of the branch. If the branch is resolved, then it is known whether the branch is to be executed. If the conditional branch is not executed, the next sequential instruction stream immediately following the branch instruction is executed. If the conditional branch is executed, then the instruction stream starting at the target address is executed.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions and determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch can be discarded from the various units of processor 200.

The execution unit 24 may include a plurality of execution units, such as fixed-point execution units, floating-point execution units, load/store execution units (or load store unit denoted as LSU), and vector multimedia execution units. The execution unit 24 may also include specialized branch predictors to predict the target of a multi-target branch. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

In an example, an execution slice may be referred to as a set of data processing circuitry or hardware units connected in series within a processor core. An execution slice may be a pipeline or pipeline-like structure. Multiple execution slices may be used as part of simultaneous multi-threading within a processor core among multiple processor cores of a multiprocessor system. In modern computer architecture, there can be multiple execution units within an execution slice including LSUs, vector-scalar units (VSUs), arithmetic logic units (ALUs), among other execution units. A LSU typically includes one or more store queues each having entries to track store instructions and hold store data, and one or more load queues each having entries to track load instructions and hold load data.

In an embodiment, processor 200 may perform branch prediction in order to speculatively fetch instructions subsequent to conditional branch instructions. Branch predictor 208 is included to perform such branch prediction operations. In an embodiment, instruction cache 204 may provide to the branch predictor 208 an indication of the instruction address being fetched, so that branch predictor 208 may determine which branch target addresses to select for forming a branch prediction. The branch predictor 208 may be coupled to various parts of the processing pipeline 210, such as, for example, execution unit 24, decode unit 20, reorder buffer, etc. to determine if the predicted branch direction is correct or incorrect.

To facilitate multithreading, instructions from different threads can be interleaved in some fashion at some point in the overall processor pipeline. An example technique to interleave instructions from different threads involves interleaving instructions on a cycle-by-cycle basis based on interleaving rules. For example, instructions from the different threads can be interleaved such that a processor can perform an instruction from a first thread in a first clock cycle, and then an instruction from a second thread in a second clock cycle, and subsequently another instruction from the first thread in a third clock cycle and so forth. Some interleaving techniques may involve assigning a priority to each thread and then interleaving instructions from the different threads based on the assigned priorities. For example, if a first thread is assigned to a higher priority than a second thread, an interleaving rule may require that twice as many instructions from the first thread assigned with the higher priority be included in the interleaved stream as compared to instructions from the second thread assigned with the lower priority. Various different interleaving rules can be set, such as rules designed for resolving threads with the same priority, or rules that interleave instructions from relatively less important threads periodically (e.g., performing instruction from a lower priority thread every X cycles).

Thread interleaving based on priorities can allow processor resources to be allotted based on the assigned priorities. However, thread priorities sometimes do not take into account processor events, such as branch mispredictions, that may affect the ability of threads to advance through a processor pipeline. These events can sometimes impact the efficiency of processor resources allotted between different instruction threads in a multi-thread processor. For example, priority-based techniques that give higher priority to threads with fewer instructions in the decode, rename, and instruction queue stages of the pipeline sometimes can be inefficient at reducing the number of wrong-path instructions caused by branch mispredictions (e.g., incorrectly speculated instructions) in the pipeline. These wrong-path instructions can tie up the fetch bandwidth and other valuable resources of the processor, such as instruction queues and other functional units.

Efficiency and/or performance of the processor 200 can be improved by reducing the number of wrong-path instructions in the processing pipeline 210. For example, threads with higher rate of mispredictions can be delayed (e.g., fetched slower by the instruction fetch unit) in the processing pipeline 210, causing a reduction in the number of wrong-path instructions in the processing pipeline 210. Further, a number of instructions following a first unfinished or unresolved branch instruction processing pipeline 210 can be tracked to prevent an excessive number of potentially wrong-path instructions being performed.

In an embodiment, the processor 200 can be a SMT processor configured to perform multithreading. The processor 200 can use one or more instruction queues 212 to collect instructions from the one or more different threads. The instruction fetch unit 206 can fetch instructions stored in the instruction cache 204 and fill the instruction queues 212 with the fetched instructions. Performance of the processor 200 can depend on how the instruction fetch unit 206 fill these instruction queues 212. The instruction fetch unit 206 can be configured to assign and manage priorities of the different threads, and based on these priorities, decide which instructions and/or which threads to fetch and send these fetched instructions to the instruction queues 212. The processor 200 can further include a thread scheduler 214 configured to schedule and distribute the instructions in the instruction queues 212 to the processing pipeline 210. In an example, the processor 200 may be a multicore processor including two or more processor cores, and each core may be configured to process one or more threads. In an example, each processor core may be configured to process a respective thread. In another example, each processor core may be configured as a multithread processor that can process multiple threads.

In an example, in response to the execution unit 24 being a load store unit (LSU) 228, a circuit 230 may be embedded or integrated in the processor 102 to selectively delay fulfillment of load requests that involve data transfer from a global memory location to a local memory location. In an example, the global location may be a memory location accessible by multiple processor elements, such as multiple threads, multiple processor cores, or multiple processors. In an example, the local location may be a memory location accessible by a processing element and/or by multiple threads running on the processing element, but inaccessible to other processing elements. In one example configuration, a L1 cache of a processing element, and/or the processing element itself, can be considered as local memory, and any higher level memory such as L2 cache, L3 cache, etc. may be considered as global memory. In another example configuration, a L2 cache can be a local memory if the L2 cache is configured to be accessible by a connected processing element, but not by other processing elements. The circuit 230 may be configured to delay fulfillment of specific load requests by a specific number of cycles, or by a random number of cycles, depending on a desired implementation. Further, the circuit 230 may be activated (e.g., switched on) or deactivated (e.g., switched off) by the processor 102. The delay to the data transfer from the global location to the local location may allow the processor 102 to have additional time to create out-of-order hazards that can be used for testing or validating load and store coherence of the processing pipeline 210. For example, the delay applied by the circuit 230 may provide additional time for a processing element to snoop another processing element to make changes to the global memory locations being indicated in the load requests being processed by the LSU 228.

Figure 3:
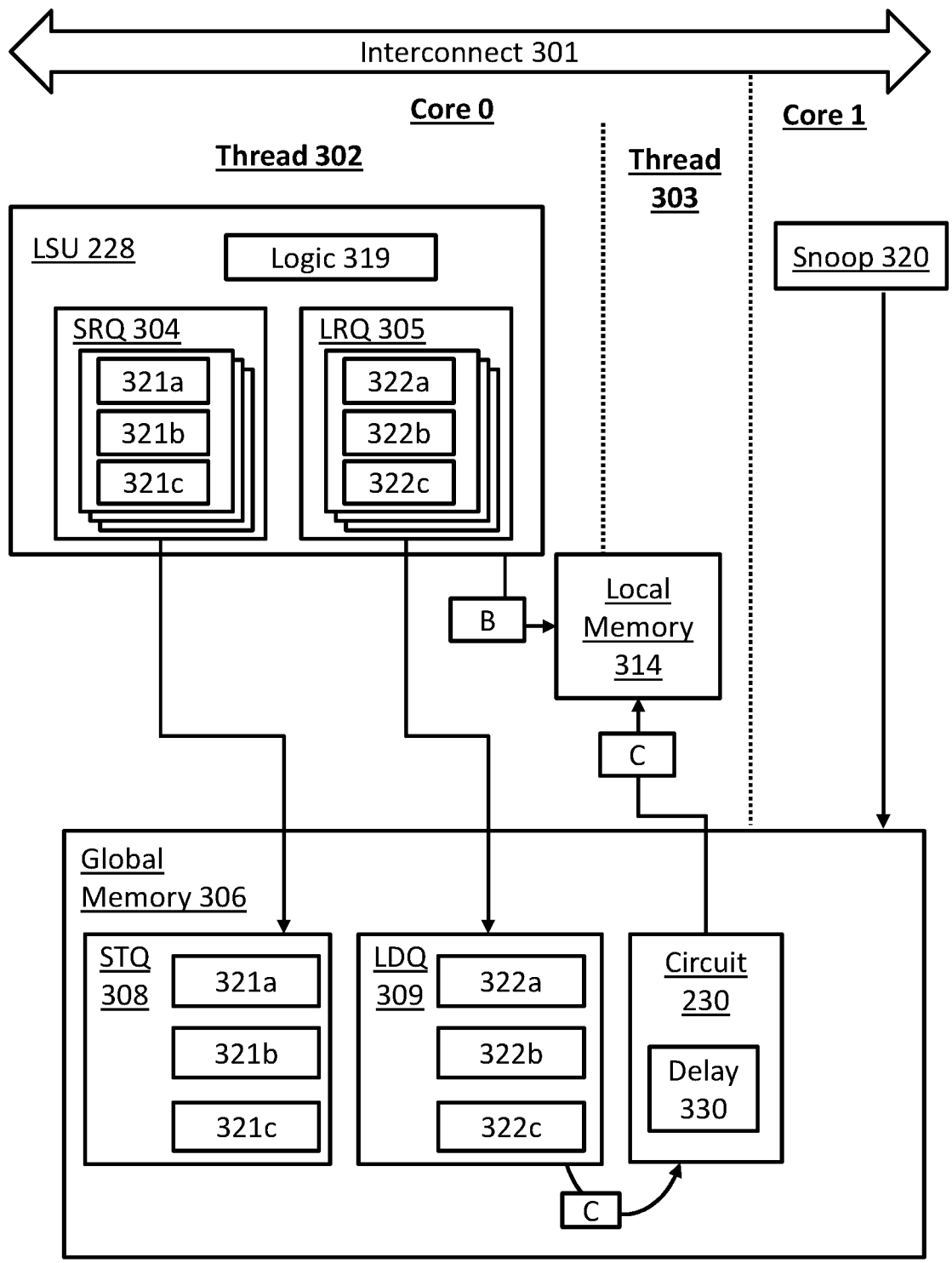
FIG. 3 illustrates an example implementation of cache coherence validation using delayed fulfillment of L2 requests in an embodiment.

FIG. 3 illustrates an example implementation of cache coherence validation using delayed fulfillment of L2 requests in an embodiment. In the example shown in FIG. 3, the processor 102 may be a multicore processor including multiple processor cores connected to one another via an interconnect 301 (e.g., a bus, mesh network, crossbar, etc.), such as a first processor core labeled as Core 0 and a second processor core labeled as Core 1. Each one of Core 0 and Core 1 may be configured to process multiple threads. For example, Core 0 may be configured to process multiple threads, such as a thread 302 and a thread 303. The threads 302, 303, and other threads running on Core 0 can access the local memory 314. The thread 302 may include an instruction stream having store instructions and load instructions. Core 0 may implement the LSU 228 to process the store instructions and load instructions of the thread 302. The LSU 228 may include a SRQ 304 and a LRQ 305. The SRQ 304 may be configured to store SRQ entries representing committed store instructions 321a, 321b, 321c. The committed store instructions 321a, 321b, 321c may be completed store instructions, but since they are stored in the SRQ 304, only Core 0 is aware that the store instructions 321a, 321b, 321c are completed. The LRQ 305 may be configured to store LRQ entries representing load instructions 322a, 322b, 322c that are waiting to be completed. The load instructions 322a, 322b, 322c may include respective target memory locations to load or fetch data from, but since they are stored in the LRQ 305, only Core 0 is aware of the target locations being indicated by the load instructions 322a, 322b, 322c.

Core 0 may include a local memory 314, where the local memory 314 may be local to Core 0. For example, the memory locations or addresses of the local memory 314 may be local to (or accessible by) Core 0 and one or more threads running on Core 0, but inaccessible by Core 1. Local memory 314 may be, for example, a L1 cache, or a memory block including a L1 cache and/or a L2 cache. Core 1 may include its own local memory that is not accessible by Core 0. The processor 102 may include a global memory 306 having global memory locations or addresses that is shared, or accessible, by all cores connected to the interconnect 301 (e.g., Core 0 and Core 1). The global memory 306 can be, for example, a L2 cache, a L3 cache, or a memory block including a L2 cache and/or a L3 cache, or other higher level memory devices. The global memory 306 may include a store queue (STQ) 308 and a load queue (LDQ) 309 that are accessible by all cores connected to the interconnect 301. In an example, a first subset of memory addresses or cache lines of the global memory 306 may be allocated to the STQ 308 and a second subset of memory addresses or cache lines of the global memory 306 may be allocated to the LDQ 309. The STQ 308 may be configured to hold or store SRQ entries drained from the SRQ 304 in the LSU 228. For example, the SRQ 304 may drain the SRQ entries representing the store instructions 321a, 321b, 321c to the STQ 308, such that data being written or updated by the store instructions 321a, 321b, 321c becomes accessible to Core 1.

The LDQ 309 may be configured to hold or store LRQ entries drained from the LRQ 305 in the LSU 228. In an example, a LRQ entry in the LRQ 305 may be drained to the LDQ 309 to request data, or to request a cache line, to be loaded from the global memory 306 to the local memory 314, the LSU 228, or to Core 0. The LRQ entries in the LRQ 305 may be drained sequentially, such that older load instructions may request its data before younger load instructions. However, the fulfillment of the load instructions from the global memory 306 may be out-of-order, causing some younger load instructions to complete before older instructions. For example, in the example shown in FIG. 3, the load instruction 322c may be an older load instruction than the load instruction 322b, and the load instruction 322b may be older than the load instruction 322a. When the load instruction 322c is drained to the LDQ 309 to request data C, if data C is not available in the global memory 306 and if the SRQ 304 does not have a committed store instruction to store data C, the load instruction 322c needs to wait for data C to be available in the global memory 306. While the load instruction 322c is waiting in the global memory 306, the load instruction 322b may be drained to the global memory 306 to request data B. In an example, if data B is not available in the global memory 306 but the SRQ 304 includes a committed store instruction to store data B, the LSU 228 may directly forward the committed store instruction storing data B to the local memory 314, the LSU 228, or to Core 0 directly without going through the local memory 314, or to the LSU 228, or Core 0 via the local memory 314.

In an example, the targets (e.g., requested cache line or global memory locations) of younger load instruction 322b and the older load instruction 322c may overlap. For example, data B may be stored in a target cache line of the global memory 306, but only a portion of data C may be stored in the target cache line in the global memory 306. Therefore, the younger load instruction 322b may be completed before the older load instruction 322c since data B is available from the target cache line, but data C is not available yet. While the younger load instruction 322b being completed, and the older load instruction 322c still waiting for data C, there is a chance that other cores (e.g., Core 1) may make changes to a part of the target cache line (e.g., writing to the target cache line) storing data B and parts of data C. Thus, when the older load instruction 322c is fulfilled, data C being read from the target cache line may be different from what was read from the completed and younger load instruction 322b.

The LSU 228 may be configured to execute a logic 319 to detect whether a younger load instruction that has overlapping target with an older load instruction is fulfilled before the older load instruction. In response to detecting a younger load instruction with overlapping target being fulfilled or completed before an older load instruction, 319 logic may trigger the LSU 228 to re-execute the younger load instruction after fulfilling the older load instruction. In order to test whether cache coherence of the processor 102 is a success or a failure, the circuit 230 may be integrated or embedded in the global memory 306 to test whether the logic 319 is functioning correctly. In an example, the logic 319 may be functioning correctly if a younger load instruction with overlapping target fulfilled before an older load instruction is re-executed in response to a fulfillment of the older load instruction. In an example, the logic 319 may not be functioning correctly if a younger load instruction with overlapping target fulfilled before an older load instruction is not re-executed in response to a fulfillment of the older load instruction.

To test whether the logic 319 is functioning correctly, out-of-order hazards will have to be created, such as fulfilling younger load instructions with overlapping targets before older load instructions and causing changes to the target such that the younger and older load instructions read different data upon fulfillment. The circuit 230 may be configured to apply a delay 330 to data transfer paths from the global memory 306 to the local memory 314 of Core 0, to the LSU 228, or to Core 0 (through or not through the local memory 314), and to other data paths from the global memory 306 to other local memory of other cores. The delay 330 may delay a data transfer to fulfill a load instruction requesting data from the global memory 306 to local memory such as L1 caches and processor cores. The delayed data transfer may provide additional time for another processing element or core to perform actions that can create out-of-order hazards for testing the logic 319, thus increase a chance of occurrences of out-of-order hazards that can be used for testing the logic 319.

In an example, the load instruction 322c may be older than the load instruction 322b, and the targets (e.g., the requested cache line(s) or global memory location) of the load instructions 322b, 322c may overlap. While the older load instruction 322c is waiting in the global memory 306, if Core 1 does not make changes to the target cache line, then there may be no out-of-order hazards created for testing the logic 319. In order to increase a chance of having Core 1 make changes to the target cache line, the circuit 230 may delay data transfer from the global memory 306 to the local memory 314, to the LSU 228, and/or to Core 0. The delayed data transfer may provide additional time for another core, such as Core 1, to make changes to the target location of the older load instruction 322c that is waiting in the global memory 306. For example, in response to the delay 330 being applied, an out-of-order hazard may be created when Core 1 snoops the global memory 306 (e.g., snoop 320) to make changes to the target location of the load instruction 322c. In an example, the delay 330 may override the availability of the requested data. For example, the circuit 230 may still apply the delay 330 even though data C is available to fulfill the load instruction 322c. The available data C may be transferred from the global memory 306 to the local memory 314 upon a lapse of the delay 330.

In an example, Core 0 may be configured to detect load instructions requesting data transfer from global memory locations (e.g., L2 cache) to local memory locations 314 (e.g., L2 cache), the LSU 228, and/or Core 0, and, in response, may switch on the circuit 230 to delay data transfer from the global memory location to the local memory location. If Core 0 detects data forwarding requests, such as requests for data to be transfer from the SRQ 304 to the local memory 314, the LSU 228, and/or Core 0, then Core 0 may not switch on the circuit 230. In an example, Core 0 may execute firmware in combination with hardware switches to control the activation and deactivation of the circuit 230 at boot time.

In an example, the delay 330 may be a specific number of cycles being added to delay data transfer from the global memory 306 to the local memory 314, the LSU 228, or Core 0. In one example embodiment, a specific group of cache lines in the global memory 306 may be assigned to undergo the delay (e.g., odd cache lines, even cache lines, or other groups or subsets of cache lines). In another example embodiment, the number of cycles in the delay 330 may be based on a distance between the processing element executing the load instruction (e.g., Core 0) and other processing elements (e.g., Core 1 and other cores). For example, the number of cycles in the delay 330 may be a multiple of a time it takes for ownership of the target cache line to travel from a nearest core or from a furthest core in the processor 102. In another example embodiment, the number of cycles in the delay 330 may cause Core 0 to perceive the target cache line as a cache line or memory location that is relatively far. In another example embodiment, the circuit 230 may include a random number generator configured to generate a random number. The generated random number may be set as the number of cycles in the delay 330 and/or the number of delayed cycles for each cache line. For example, the delay 330 applied to a first cache line may be a first number of cycles and the delay 330 applied to a second cache line may be a second number of cycles. In an example, the circuit 230 may include linear feedback shift registers (LFSR) that may implement random number generation.

Figure 4:
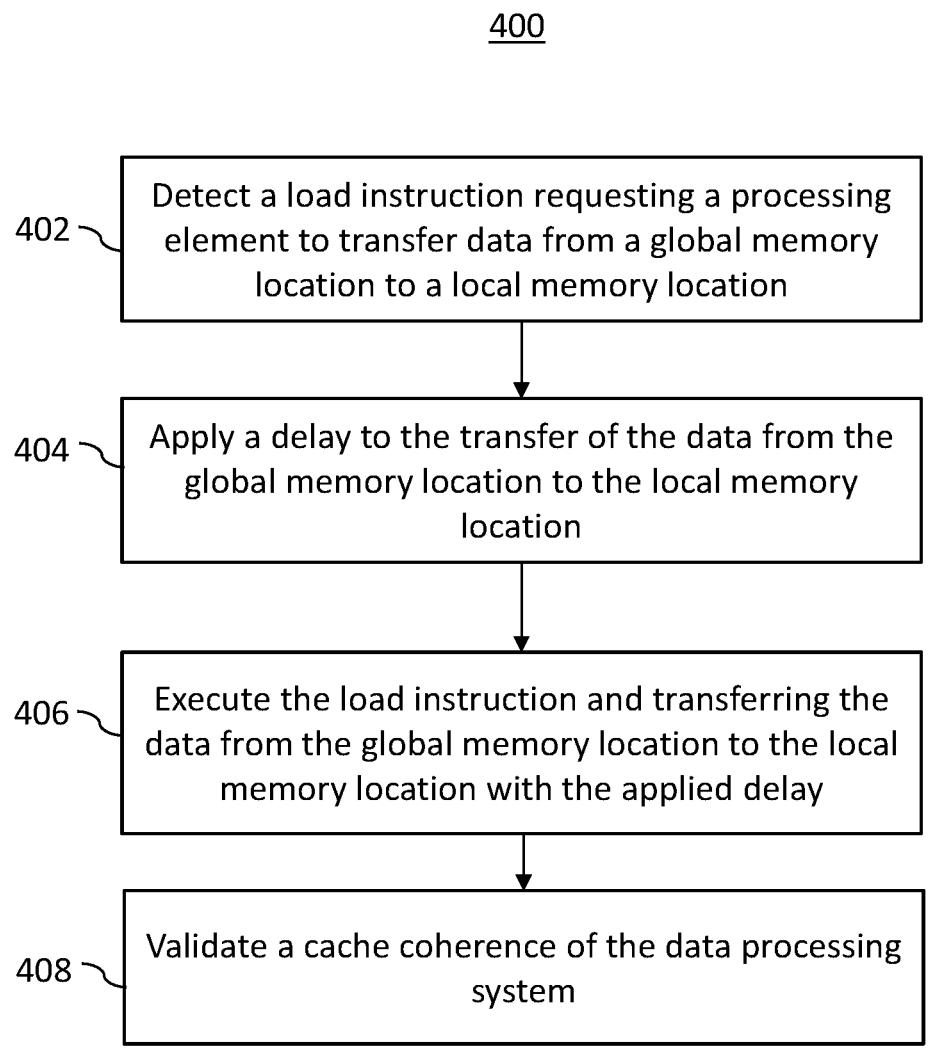
FIG. 4 illustrates an example flowchart example of cache coherence validation using delayed fulfillment of L2 requests according to an embodiment.

FIG. 4 illustrates an example flowchart example of cache coherence validation using delayed fulfillment of L2 requests in one embodiment. The process 400 can include one or more operations, actions, or functions as illustrated by one or more of blocks 402, 404, 406, and/or 408. Although illustrated as discrete blocks, various blocks can be divided into additional blocks, combined into fewer blocks, eliminated, performed in parallel, or performed in different order, depending on the desired implementation.

The process 400 may be implemented by a processing element to validate cache coherence in a data processing system. The process 400 may begin at block 402. At block 402, the processing element may detect a load instruction requesting the processing element to transfer data from a global memory location to a local memory location. The processing element may be among a plurality of processing elements of the data processing system. In an example, the global memory location may be a memory location in a level two (L2) cache connected to the plurality of processing elements in the data processing system, and the local memory location may be a memory location in a level one (L1) cache of the processing element. In an example, the load instruction may be a first load instruction, and applying the delay may cause the execution of the first load instruction to be completed later than an execution of a second load instruction. The second load instruction may be younger than the first load instruction, and the second load instruction may have a target that overlaps with a target of the first load instruction.

The process 400 may proceed from block 402 to block 404. At block 404, the processing element may apply, in response to detecting the load instruction requesting the processing element to transfer data from the global memory location to the local memory location, a delay to the transfer of the data from the global memory location to the local memory location. In an example, the application of the delay to the transfer of data may increase a window of opportunity for another processing element to make changes relating to the global memory location. The changes relating to the global memory location may create an out-of-order hazard for the data processing system. In an example, the global memory location may be a cache line assigned to undergo the delay. In an example, the delay may be based on a random number. In an example, the delay is based on a distance between the processing element and other processing elements in the data processing system.

The process 400 may proceed from block 404 to block 406. At block 406, the processing element may execute the load instruction and transferring the data from the global memory location to the local memory location with the applied delay. The process 400 may proceed from block 406 to block 408. At block 408, the processing element may validate, in response to executing the load instruction and transferring the data with the applied delay, a cache coherence of the data processing system. In an example, in response to completing the execution of the first load instruction, the processing element may detect whether the second load instruction is being re-executed. In response to the second load instruction being re-executed, the processing element may determine the cache coherence of the data processing system is successful. In response to the second load instruction not being re-executed, the processing element may determine the cache coherence of the data processing system failed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. It must also be noted that, as used in the specification and the appended claims, the singular forms "a", "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for validating cache coherence in a data processing system, the method comprising:
   detecting a load instruction requesting a processing element to transfer data from a target cache line in a global memory location to a local memory location, the processing element being among a plurality of processing elements of the data processing system;
   applying, in response to detecting the load instruction requesting the processing element to transfer the data from the target cache line in the global memory location to the local memory location, a delay in the global memory location to delay the transfer of the data from the target cache line in the global memory location to the local memory location, wherein applying the delay to the transfer of the data increases a window of opportunity for another processing element to make changes to the target cache line in the global memory location to create an out-of-order hazard for the data processing system, and wherein the delay is based on a distance between the processing element and other processing elements in the data processing system;
   executing the load instruction and transferring the data from the target cache line in the global memory location to the local memory location with the applied delay; and validating, in response to executing the load instruction and transferring the data with the applied delay, a cache coherence of the data processing system.

2. The method of claim 1, wherein:
the global memory location is a memory location in a level two (L2) cache connected to the plurality of processing elements in the data processing system; and
the local memory location is a memory location in a level one (L1) cache of the processing element.

3. The method of claim 1, wherein the load instruction is a first load instruction, and applying the delay causes the execution of the first load instruction to be completed later than an execution of a second load instruction, the second load instruction being younger than the first load instruction, wherein the first load instruction and the second load instruction each loads from the target cache line.

4. The method of claim 3, wherein validating the cache coherence of the data processing system comprises:
in response to completing the execution of the first load instruction, detecting whether the second load instruction is being re-executed;
in response to the second load instruction being re-executed, determining the cache coherence of the data processing system is successful; and
in response to the second load instruction not being re-executed, determining the cache coherence of the data processing system has failed.

5. The method of claim 3, wherein:
validating the cache coherence of the data processing system comprises:
executing a logic that is programmed to re-execute the second load instruction after the first load instruction is executed with the applied delay;
in response to the second load instruction being re-executed after the first load instruction is executed with the applied delay, determining that the logic is functioning correctly; and
in response to the second load instruction not being re-executed after the first load instruction is executed with the applied delay, determining that the logic is not functioning correctly.

6. The method of claim 1, wherein the delay is based on a random number.

7. The method of claim 1, further comprising:
detecting a data forwarding request to transfer data from a load store unit of the processing element to the local memory location; and
executing the data forwarding request and transferring the data from the load store unit of the processing element to the local memory location without the delay.

8. The method of claim 1, wherein the changes to the target cache line comprises writing to the target cache line.

9. The method of claim 1, further comprising controlling one or more linear feedback shift registers to generate the delay.

10. A computing system comprising:
a first processing element;
a second processing element;
an interconnect connected to the first processing element and the second processing element;
the first processing element being configured to:
detect a load instruction requesting a processing element to transfer data from a target cache line in a global memory location to a local memory location, the global memory location being accessible by the first processing element and the second processing element, and the local memory location being accessible by the first processing element;
apply, in response to detecting the load instruction requesting the first processing element to transfer the data from the target cache line in the global memory location to the local memory location, a delay in the global memory location to delay the transfer of the data from the target cache line in the global memory location to the local memory location, wherein application of the delay to the transfer of the data increases a window of opportunity for the second processing element to make changes to the target cache line in the global memory location to create an out-of-order hazard and wherein the delay is based on a distance between the first processing element and other processing elements in the computing system;
execute the load instruction and transfer the data from the target cache line in the global memory location to the local memory location with the applied delay; and
validate, in response to the execution of the load instruction and transferring the data with the applied delay, a cache coherence of the computing system.

11. The computing system of claim 10, further comprising a level two (L2) cache connected to the first processing element and the second processing element, wherein:
the global memory location is a memory location in the L2 cache; and
the local memory location is a memory location in a level one (L1) cache of the first processing element.

12. The computing system of claim 10, wherein the load instruction is a first load instruction, and the application of the delay causes the execution of the first load instruction to be completed later than an execution of a second load instruction, the second load instruction being younger than the first load instruction, wherein the first load instruction and the second load instruction each loads from the target cache line.

13. The computing system of claim 12, wherein the first processing element is configured to:
in response to completing the execution of the first load instruction, detect whether the second load instruction is being re-executed;
in response to the second load instruction being re-executed, determine the cache coherence of the computing system is successful; and
in response to the second load instruction not being re-executed, determine the cache coherence of the computing system has failed.

14. The computing system of claim 10, wherein the delay is based on a random number.

15. A processing element comprising:
a processor pipeline comprising one or more load store units (LSUs) configured to execute load and store instructions, the one or more LSUs being configured to:
detect a load instruction requesting the processing element to transfer data from target cache line in a global memory location to a local memory location, the processing element being among a plurality of processing elements of a data processing system;
apply, in response to detecting the load instruction requesting the processing element to transfer the data from the target cache line in the global memory location to the local memory location, a delay in the global memory location to delay the transfer of the data from the target cache line in the global memory location to the local memory location, wherein application of the delay to the transfer of the data increases a window of opportunity for the another processing element to make changes to the target cache line in the global memory location to create an out-of-order hazard, and wherein the delay is based on a distance between the processing element and other processing elements in the data processing system;

execute the load instruction and transfer the data from the target cache line in the global memory location to the local memory location with the applied delay; and validate, in response to executing the load instruction and transferring the data with the applied delay, a cache coherence of the data processing system including the processing element.

16. The processing element of claim 15, wherein:
the global memory location is a memory location in a level two (L2) cache connected to the plurality of processing elements in the data processing system; and
the local memory location is a memory location in a level one (L1) cache of the processing element.

17. The processing element of claim 15, wherein:
the load instruction is a first load instruction, and applying the delay causes the first load instruction to be fulfilled later than a fulfillment of a second load instruction, the second load instruction being younger than the first load instruction and the second load instruction has a target that overlaps with a target of the first load instruction;

the one or more LSUs being configured to:
  in response to completing the execution of the first load instruction, detect whether the second load instruction is being re-executed;
  in response to the second load instruction being re-executed, determine the cache coherence of the data processing system is successful; and
  in response to the second load instruction not being re-executed, determine the cache coherence of the data processing system has failed.

* * * * *